United States Patent [19]

Hullender et al.

[11] Patent Number: 6,061,472
[45] Date of Patent: May 9, 2000

[54] METHOD AND MECHANISM TO REDUCE HANDWRITING RECOGNIZER ERRORS USING MULTIPLE DECISION TREES

[75] Inventors: Gregory N. Hullender, Kirkland; John R. Bennett; Patrick M. Haluptzok, both of Redmond, all of Wash.

[73] Assignee: Microsoft Corporation, Redmond, Mass.

[21] Appl. No.: 08/870,559

[22] Filed: Jun. 6, 1997

[51] Int. Cl.[7] ............................... G06K 9/00; G06K 9/62
[52] U.S. Cl. ........................................... 382/187; 382/224
[58] Field of Search ................................... 382/187–189, 382/224–227

[56] References Cited

U.S. PATENT DOCUMENTS

| 4,589,142 | 5/1986 | Bednar . |
| 4,975,975 | 12/1990 | Filipski .................................... 382/227 |
| 5,067,165 | 11/1991 | Nishida . |

OTHER PUBLICATIONS

H. Guo et al., Classification trees with neural network feature extraction, IEEE Transactions on Neural Networks, p. 923–933, Nov. 1992.

Breiman et al., Classification and Regression Trees, Wadsworth & Brooks, pp. 27–36, 66–81, 1984.

Steinberg et al., CART: Classification and Regression Trees, Tree–structured nonparmetric data analysis, Salford Systems, pp. 12–24, 87–105, 1995.

Burges et al., "Recognition of Handwritten Cursive Postal Words Using Neural Networks," USPS Advanced Technol Conference, (Nov. 30–Dec. 2, 1992).

Burges et al., "Shortest Path Segmentation: A Method for Training a Neural Network to Recognize Character Strings," IJCNN '92 Conference Proceedings, vol. 3, pp. 165–171 (1992).

Rumelhart, David E., "Theory to Practice: A Case Study—Recognizing Cursive Handwriting," *Computational Learning & Cognition*, Proceedings of the Third NEC Research Symposium, Chapter 8, pp. 177–196 (1992).

Forney Jr., G. David, "The Viterbi Algorithm," Proceedings of the IEEE, vol. 61, No. 3 (Mar. 1973) pp. 268–278.

*Primary Examiner*—Amelia Au
*Assistant Examiner*—Martin E. Miller
*Attorney, Agent, or Firm*—Michalik & Wylie, PLLC

[57] ABSTRACT

An improved method and mechanism for recognizing chirographs (handwritten characters) input into a computer system. A primary recognizer is provided for converting chirographs to code points, and secondary recognizers such as binary CART trees are developed and trained to differentiate chirographs which produce certain code points at the primary recognizer. Each such secondary recognizer is associated with each selected code point. When a chirograph is received, the chirograph is provided to the primary recognizer whereby a code point corresponding thereto is received. If the code point corresponds to one of the secondary recognizers, the chirograph is passed to the secondary recognizer, and a code point is returned from the secondary recognizer. If not, the code point provided by the primary recognizer is returned. The invention sets forth an automated process for training the CART trees and for optimizing the recognition mechanism by discarding CART trees which do not improve on the recognition accuracy of the primary recognizer.

1 Claim, 14 Drawing Sheets

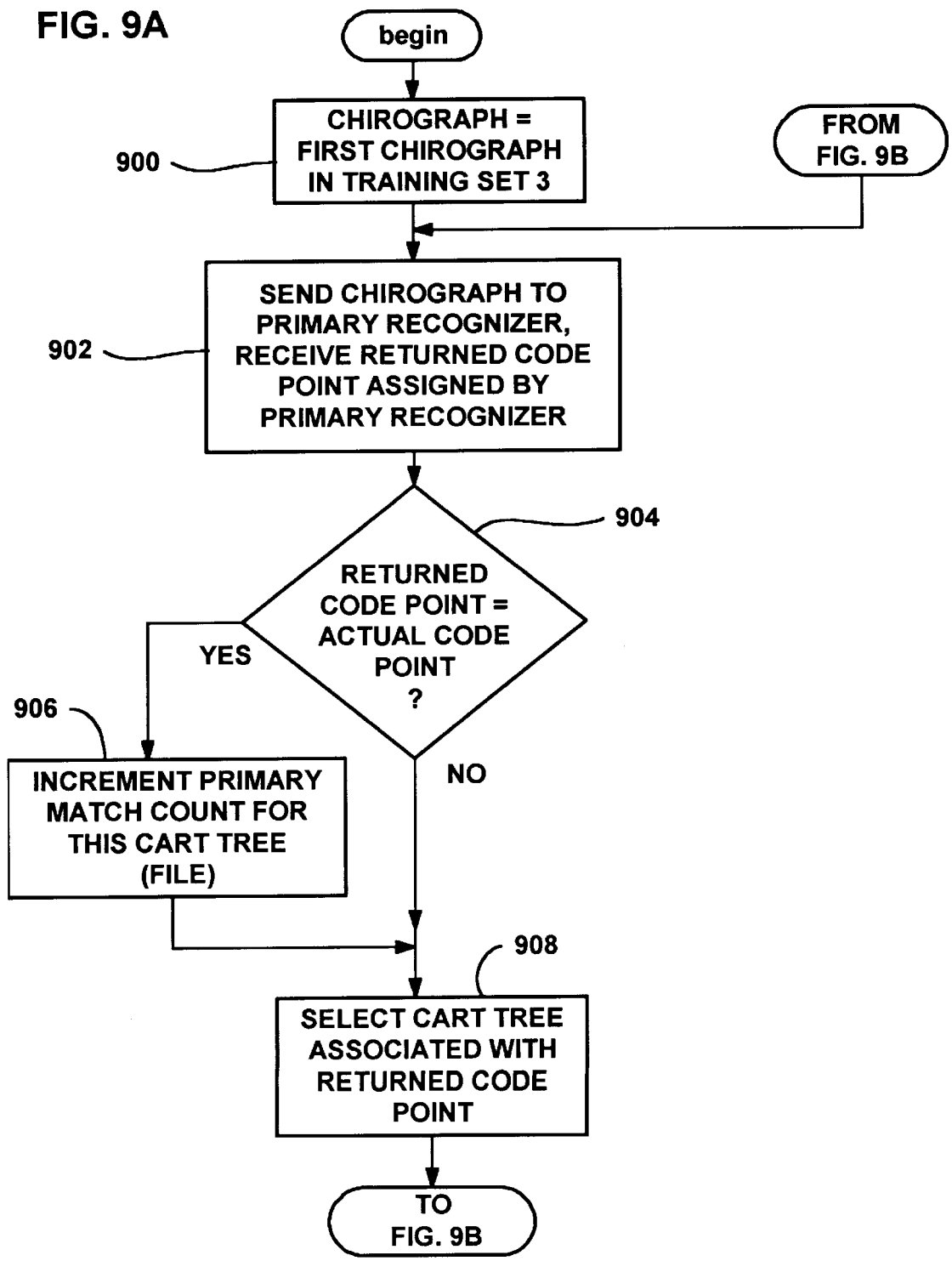

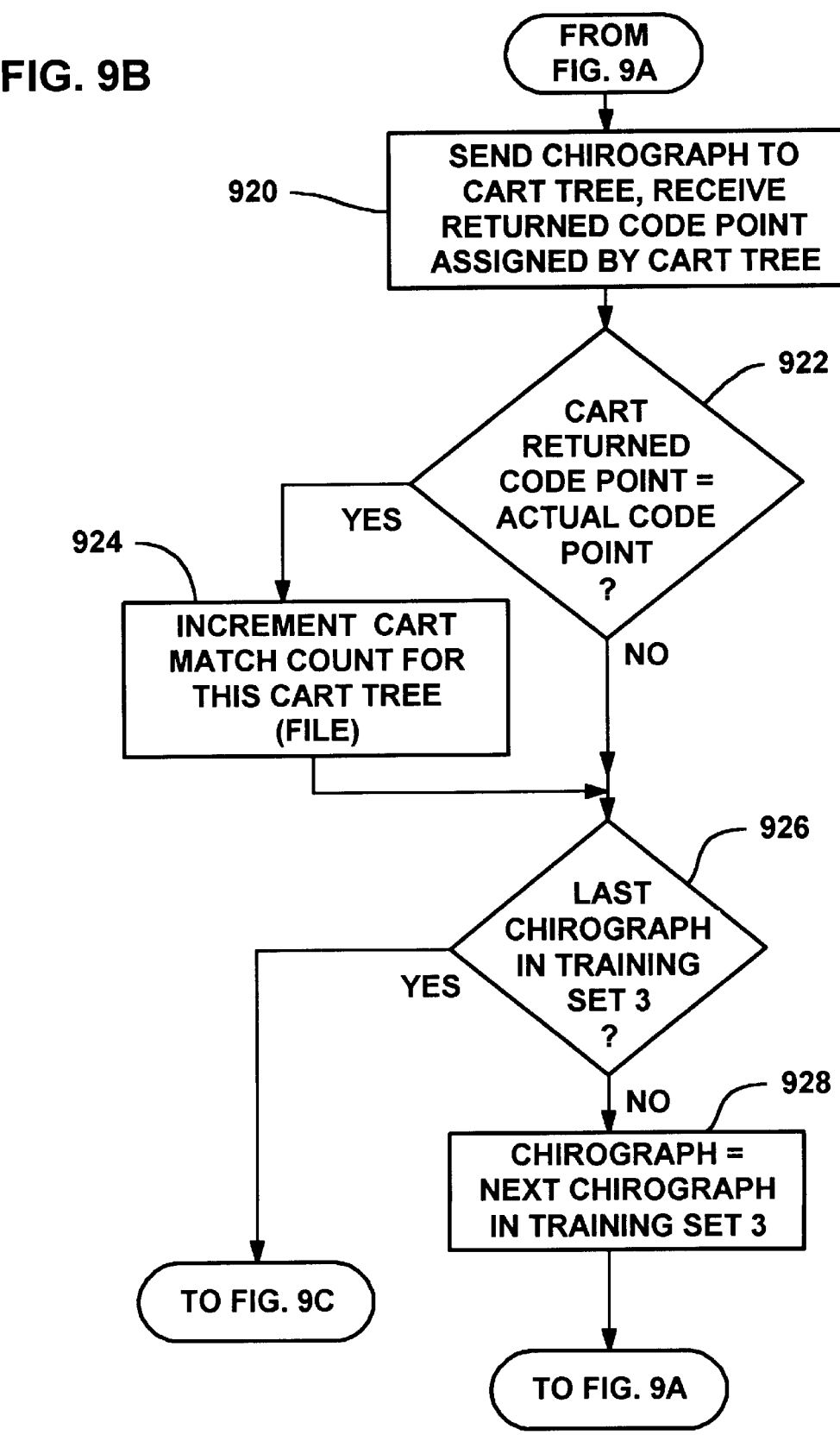

METHOD AND MECHANISM TO REDUCE HANDWRITING RECOGNIZER ERRORS USING MULTIPLE DECISION TREES

FIELD OF THE INVENTION

The invention relates generally to the input of user information into computer systems, and more particularly to the recognition of handwritten characters input by a user.

BACKGROUND OF THE INVENTION

One of the biggest problems in handwriting recognition technology is reducing the error rate. One frequent type of error results when a user electronically enters a handwritten character, known as a chirograph, that closely matches two or more possible characters in a set to which the computer is trying to match the chirograph, i.e., a set of possible code points. Characters which cause the most errors are typically those which are identical to one another except for a single difference that humans can discern, but contemporary recognizers cannot. For example, certain Japanese symbols are substantially identical to one another but for a single, subtle difference.

The problem arises in that most handwriting recognition systems use recognizers based on Neural Nets, Hidden Markov Models (HMM) or a K-Nearest-Neighbor (KNN) approach. These systems perform reasonably well at the task of classifying characters based on their total appearance, but where two characters are identical except for a single difference, they often fail. While attempts have been made to manually code recognizers to discern between particularly troublesome pairs, there are many sets of characters which are easily confused for one another. This makes the coding process very labor intensive and tedious. Moreover, the result of the coding depends on one or more person's best guesses as to what to test for to distinguish the characters. This is not necessarily very optimal, as there are many possibilities for what best differentiates two (or more) close characters. Indeed, the best of such systems do not substantially reduce the error rate. Lastly, each time the recognizer is changed, the set of characters which are confused by the recognizer also changes, requiring that much of the labor-intensive coding process be repeated.

Another type of recognition system, based on Decision trees, especially Classification and Regression Trees (CART), has been attempted for handwriting recognition. These types of systems have been rejected because they are unable to make reliable decisions from among large numbers of characters. By way of example, for systems using Japanese character sets, 6650 different characters are supported. As can be appreciated, developing a binary tree that can receive any one of 6550 characters and test that character repeatedly and properly down appropriate branches until a single correct result is found would be an extremely difficult and massive undertaking.

OBJECTS AND SUMMARY OF THE INVENTION

Accordingly, it is a general object of the present invention to provide an improved method and mechanism for reducing the error rate in handwriting recognition.

In accomplishing that object, it is a related object to provide a method and mechanism that differentiates ordinarily-confused characters with a high rate of success.

Another object is to provide a method and system of the above kind that can be automatically trained using sample data.

Yet another object is to provide a method and mechanism of the above kind that is fast, reliable, cost-efficient, flexible and extensible.

Briefly, the present invention provides a method and mechanism for recognizing chirographs input into a computer system. A primary recognizer is provided for converting chirographs to code points, and secondary recognizers (e.g., CART trees) are developed and trained to differentiate chirographs which produce selected code points. Each such secondary recognizer is associated with each selected code point. When a chirograph is received, the chirograph is provided to the primary recognizer whereby a code point corresponding thereto is received. A determination is made as to whether the code point corresponds to one of the selected code points having a secondary recognizer associated therewith. If not, the code point provided by the primary recognizer is returned. If so, the chirograph is passed to the secondary recognizer, and a code point is returned from the secondary recognizer.

Other objects and advantages will become apparent from the following detailed description when taken in conjunction with the drawings, in which:

BRIEF DESCRIPTION OF THE DRAWINGS

FIGS. 9A–9C comprise a flow diagram representing the general steps taken to optimize the recognition mechanism of the present invention;

DETAILED DESCRIPTION OF THE PREFERRED EMBODIMENT

Figure 1:
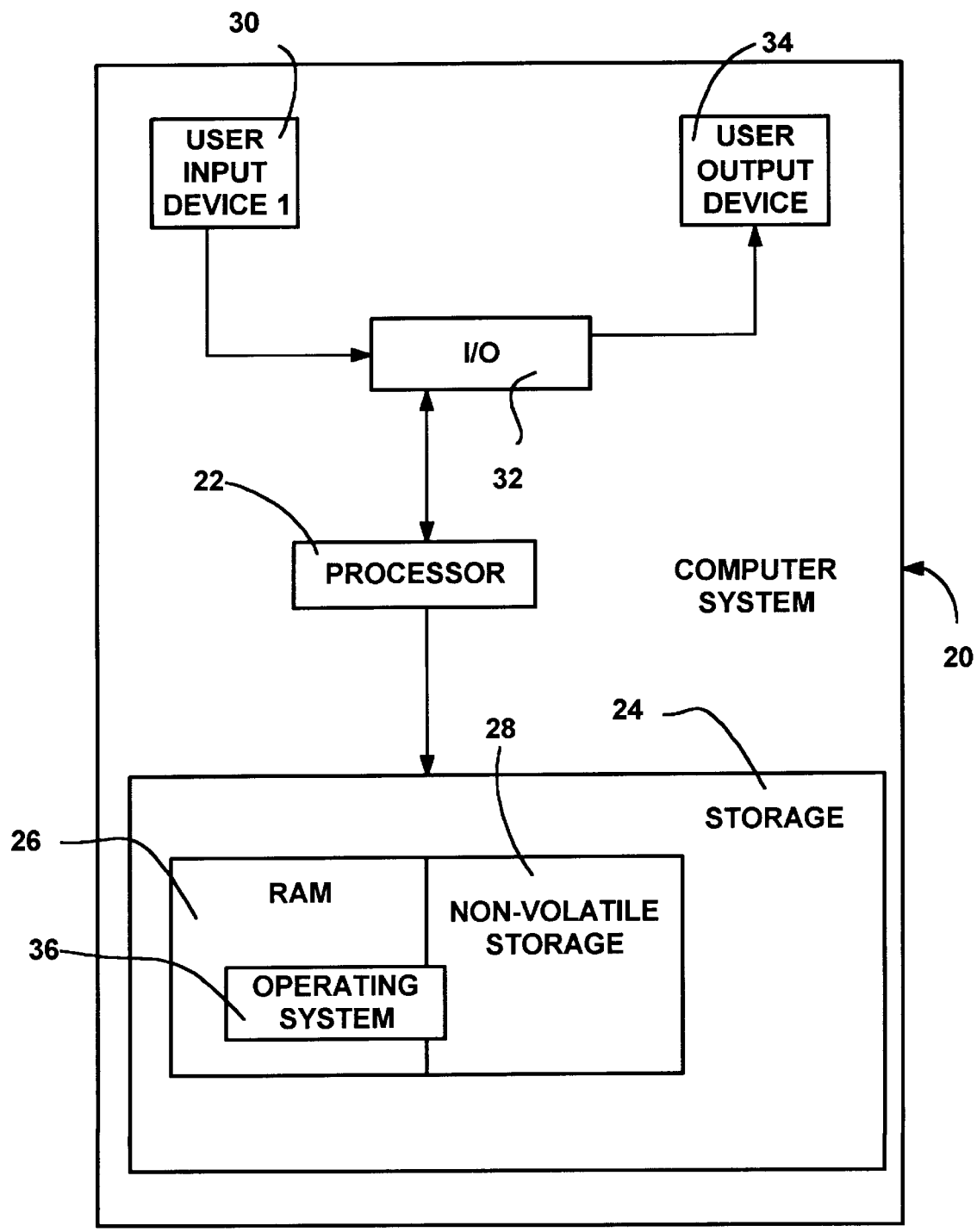
FIG. 1 is a block diagram representing a computer system into which the present invention may be incorporated.

Turning to the drawings and referring first to FIG. 1, there is shown a computer system generally designated 20 into which the present invention may be incorporated. The computer system 20 includes a processor 22 operatively connected to storage 24, the storage including random access memory (RAM) 26 and non-volatile storage 28 such as a hard disk-drive, optical drive or the like. As can be appreciated, the non-volatile storage can be used in conjunction with the RAM to provide a relatively large amount of virtual memory via well-known swapping techniques.

The processor 22 also connects through I/O circuitry 32 to one or more input devices 30, such as a keyboard and pointing device such as a mouse, and a pen-tablet, touch device or other means of getting electronic ink. The system 20 also includes at least one local output device 34 connected to the I/O circuitry 32 for communicating information, such as via a graphical user interface, to the user of the system 20. An operating system is loaded in the storage 24.

In accordance with one aspect of the present invention, and as described in more detail below, those chirographs which often confuse a recognizer are provided to a secondary recognition process. To this end, for each input chirograph, a conventional (primary) recognizer outputs a code point. Instead of directly returning the code point, however, the code point is first examined to determine if it corresponds to a confusion set, i.e., one of two (or more) code points indicative of chirographs which are often confused for each other. If the returned code point does not belong to a confusion set, the code point originally returned by the primary recognizer is returned by the mechanism. However, if the code point indicates a confusion set, a secondary recognizer, specifically developed to distinguish that particular confusion set, is given the chirograph. The secondary recognizer analyzes the chirograph using more directed tests than performed by the primary recognizer, and returns one of the two (or more) code points based on the results of the tests. Note that such often-confused chirographs are not limited to sets of two, but are often confused with two or more other chirographs.

In an alternative embodiment, the primary recognizer can be trained to recognize shape classes that represent code points (or subsets of codepoints) that look alike. When provided with a chirograph, the primary recognizer thus returns at least one shape class index. The secondary recognizer then determines from the shape class index which code point the chirograph represents. Note that a shape class index is a more general concept, i.e., a code point is a particular type of shape class index. However, for purposes of simplicity, the invention will be described with respect to a primary recognizer that returns code points, except where otherwise noted.

Thus, it should be noted that there are two distinct aspects of the present invention. A first aspect involves the development of the improved recognition mechanism of the present invention using handwriting sample data taken from a number (preferably a large number such as thousands) of users. A second aspect involves the use of a recognition mechanism, developed according to the first aspect of the invention, to convert a chirograph into a code point. The first aspect, the development of the recognition mechanism, is ordinarily performed in a development environment on a relatively high powered computer system, which may be connected via a network connection or the like to large databases of sample data. The second aspect, the use of the recognition mechanism, is typically performed on a hand-held (palm-top) computing device or the like. Such a device preferably runs under the Windows CE operating system loaded in the storage 24, and includes a touch-sensitive liquid crystal display screen for inputting handwritten characters (chirographs). Other preferred systems include tablet-based desktop personal computers running under the Windows 95 or Windows NT operating systems.

Figure 2:
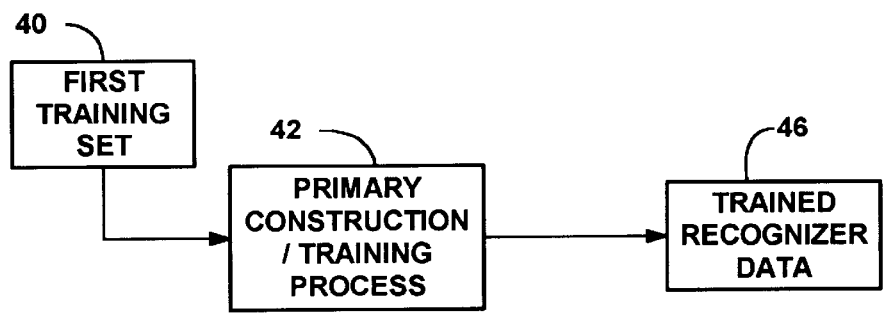
FIG. 2 is a block diagram representing functional components for training a primary handwriting recognizer according to one aspect of the invention.
Figure 3:
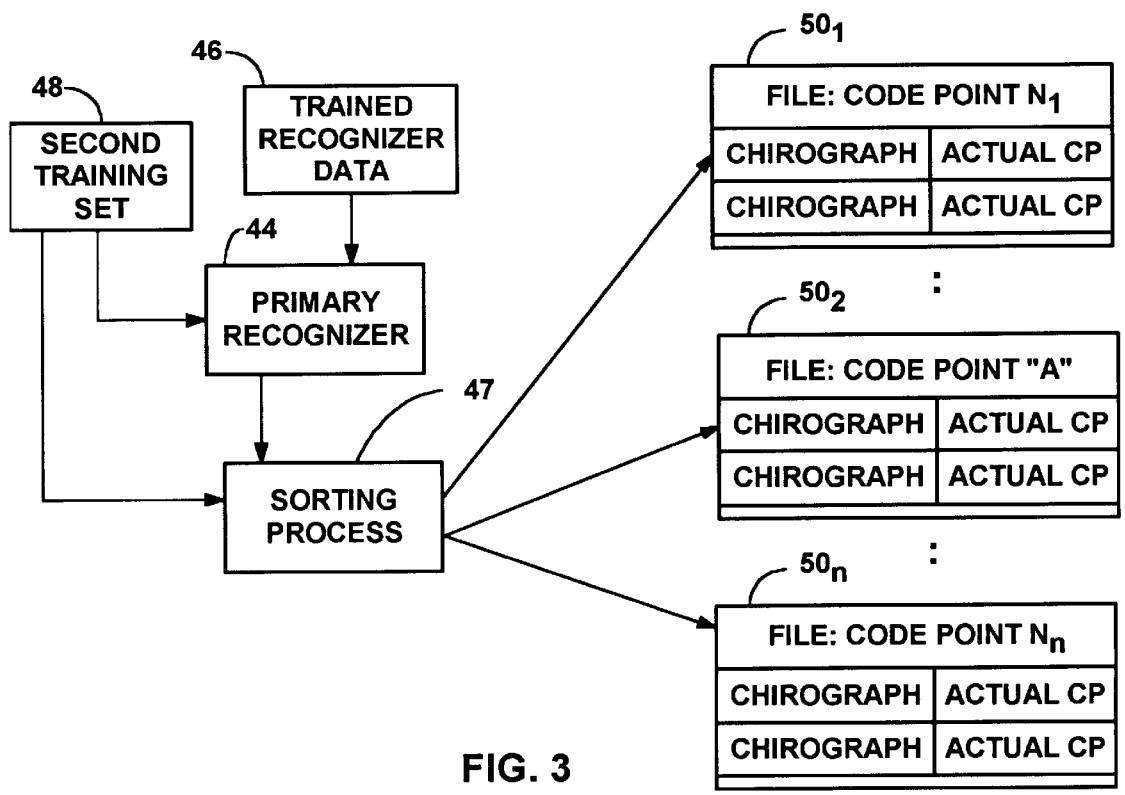
FIG. 3 is a block diagram representing functional components for sorting chirographs as recognized by a primary recognizer into code point-based files to develop a secondary recognition system according to the present invention.
Figure 4:
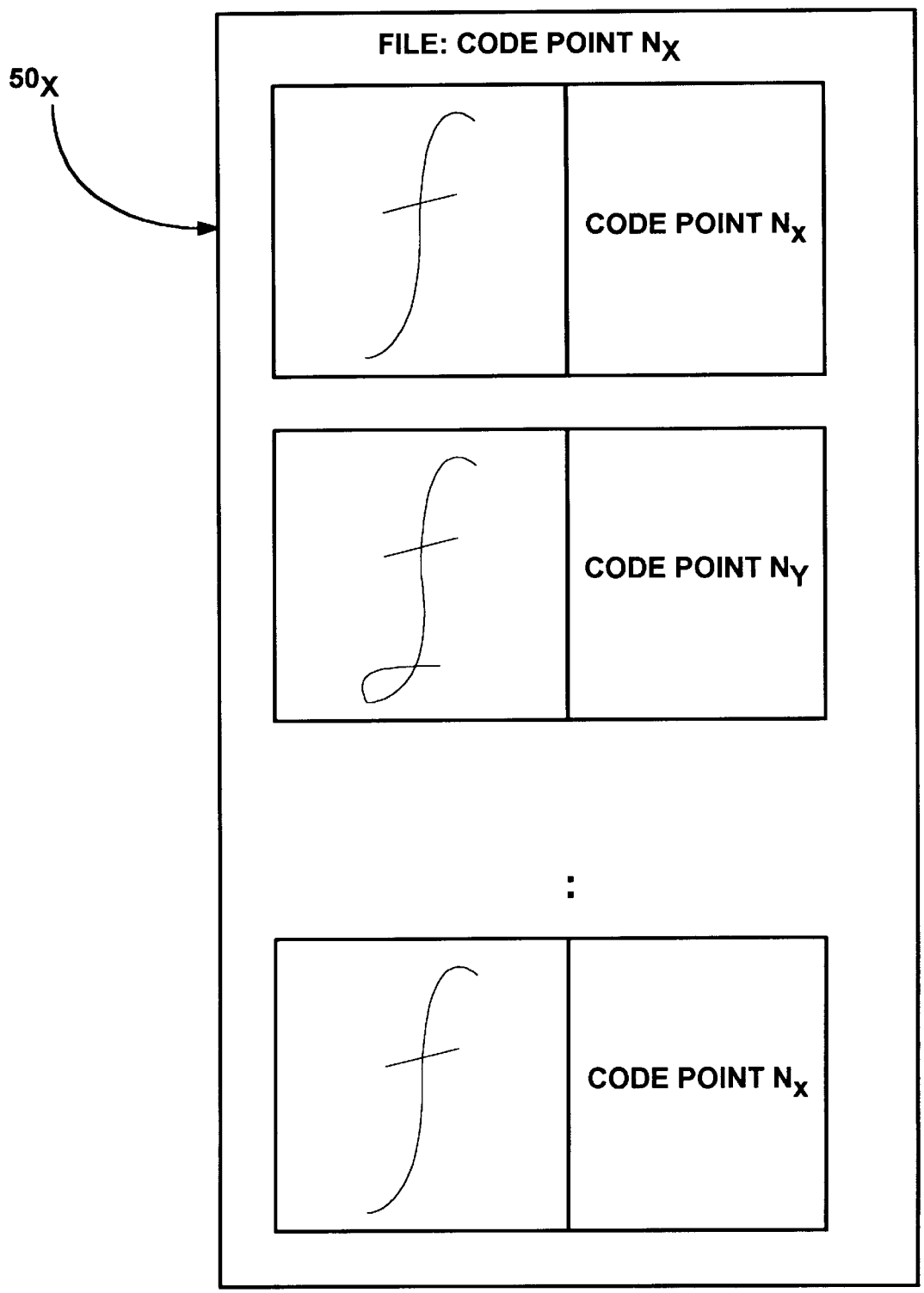
FIG. 4 represents the contents of an exemplary file sorted by the primary recognizer in FIG. 3.

Turning to the development of the recognition mechanism with initial reference to FIGS. 2–4, a first training set 40 of sample characters is used by a construction/training process 42 to develop and train a primary recognizer 44 (FIG. 3). A training set is a file including chirographs stored in conjunction with their actual, correct code points, i.e., the code points identifying the character that the user intended to write. The primary recognizer 44 is preferably one which uses a nearest neighbor (KNN) approach. Such recognizers and their construction and training are known and are thus not described in detail hereinafter, except to note that the recognizer 44 matches chirographs to trained recognizer data 46 (such as endpoint information) to output a code point. Also, it is noted that the recognizer 44 actually may return a (probability-ranked) list of alternative code points in response to a chirograph input thereto, however for purposes of simplicity the present invention will be described with reference to a single returned code point unless otherwise noted. Note that the primary recognizer can also be of the type that returns any type of shape index, with shape codes used to train the primary recognizer. As can be appreciated by those skilled in the art, this technique will work equally well for any recognizer or pattern matching technique that returns discrete proposals.

According to one aspect of the present invention and as best shown beginning in FIG. 3, the primary recognizer 44 is used to begin constructing the secondary recognition mechanisms described above. In general, a sorting process 47 sorts chirographs according to whatever code point (or other shape index) the primary recognizer 44 returns for that chirograph, whereby the way in which the chirographs are sorted with respect to their actual code points ultimately reveals the chirographs that the primary recognizer 44 tends to confuse. To this end, once the primary recognizer 44 has been constructed (FIG. 2), a second training set 48 containing sample chirographs, each stored along with its actual code point, is provided to the primary recognizer 44. Using its trained recognizer data 46, the primary recognizer 44 returns a code point to the sorting process 47, which sorts the chirographs and actual code points into various files $50_1$–$50_n$. Note that if other types of shape indexes are being used, the chirographs are similarly sorted into files for each shape index based on the shape index returned by the primary recognizer 44.

Figure 5:
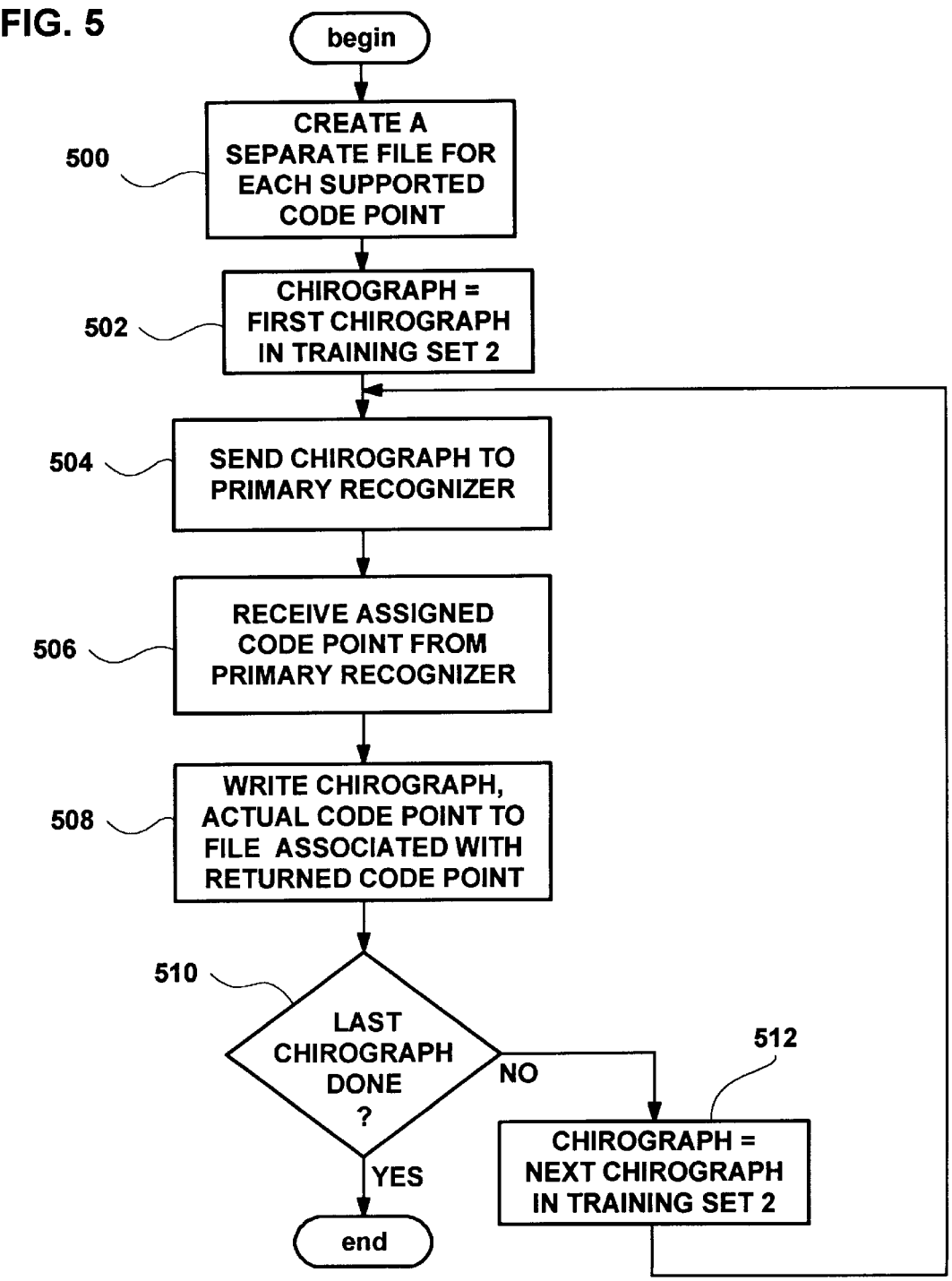
FIG. 5 is a flow diagram representing the general steps taken to sort the chirographs.

More particularly, as shown in FIG. 5, at step 500 the sorting process 47 first creates a separate file for each code point that is to be supported by the recognition mechanism. The first chirograph in the second training set 48 is selected at step 502, and sent to the primary recognizer 44 at step 504. At step 506, a code point, (which may, in fact, be incorrect) is returned by the primary recognizer 44 to the sorting process 47, and at step 508 written to the file that is associated with the returned code point, along with the actual code point known from the training set 48. For example, if a code point identifying an "A" is returned, the sorting process 47 writes the chirograph that provoked the "A" response along with its actual code point (which may not be an "A") into the "A" file $50_2$. As is apparent from FIG. 5, steps 510–512 repeat the sorting process 47 with a subsequent chirograph until all chirographs in the training set 48 have been sorted in this manner. Note that the process is the same for shape indexes other than code points.

By way of example, FIG. 4 shows the contents of one such file $50_X$, with two confused chirographs therein having different actual code points $N_X$ and $N_Y$. At some time during the sorting process, each distinct chirograph (code points $N_X$ or $N_Y$) had been recognized by the primary recognizer 44 as having $N_X$ as its code point. Accordingly, the sorting process 47 wrote each chirograph and its actual code point into the NX file $50_X$. Note that if the primary recognizer 44 made no mistakes, all of the files would contain only (chirograph, actual code point) pairs which matched the code point identifying the file. However, no primary recognizer has ever been found to have such accuracy when provided with suitably large training sets.

Figure 6:
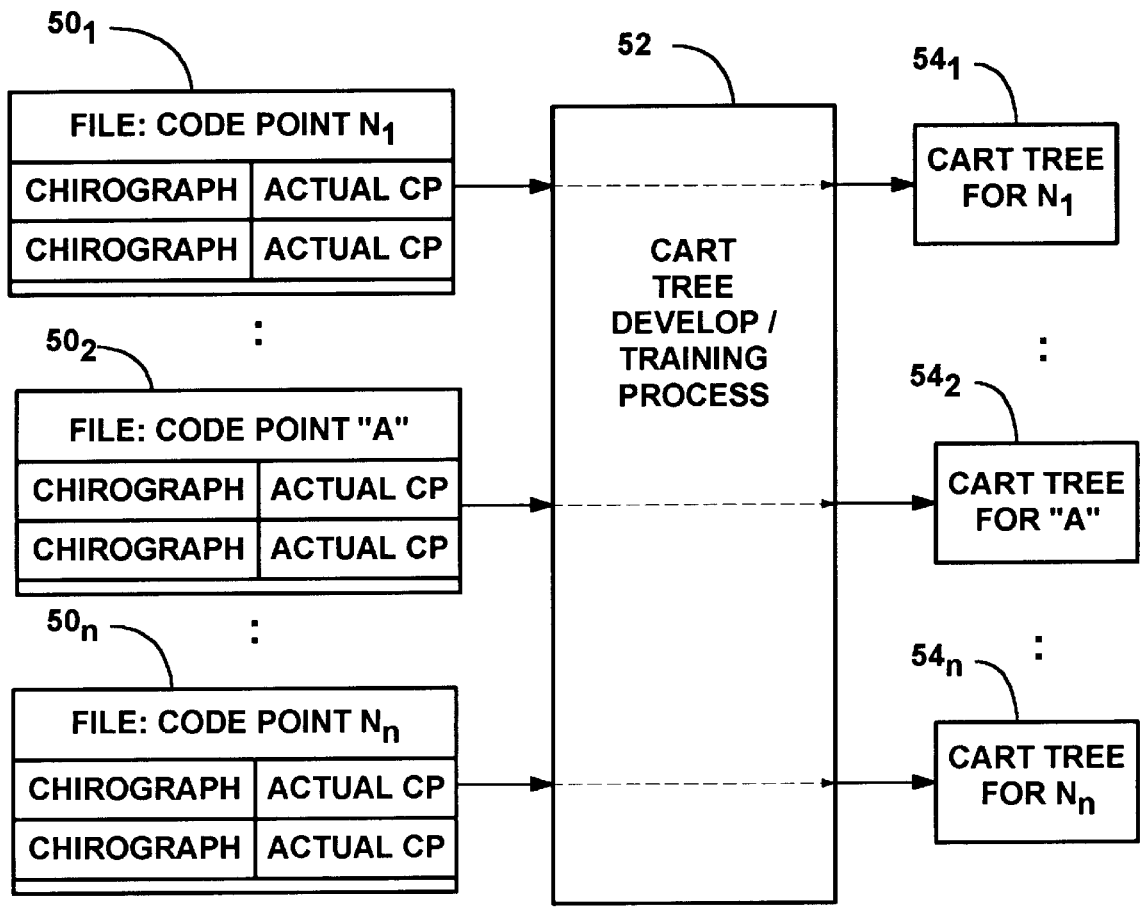
FIG. 6 is a block diagram representing functional components for generating the secondary recognition system from the files of FIG. 3.

Once the second training set 48 has been sorted into the files $50_1$–$50_n$, the files $50_1$–$50_n$ are used by a secondary recognizer development/training process 52 to develop the secondary recognizers. As shown in FIG. 6, Classification and Regression Trees (CART, or CART trees) are used as the secondary recognizers. CART trees are binary decision trees described in the text entitled *Classification and Regression Trees*, Breiman, Friedman, Olshen and Stone, Chapman and Hall, (1984), and herein incorporated by reference in its entirety. At this time in the process, one CART tree in a set $54_1$–$54_n$ will be developed and trained for each code point (or shape index) supported.

Figure 7A:
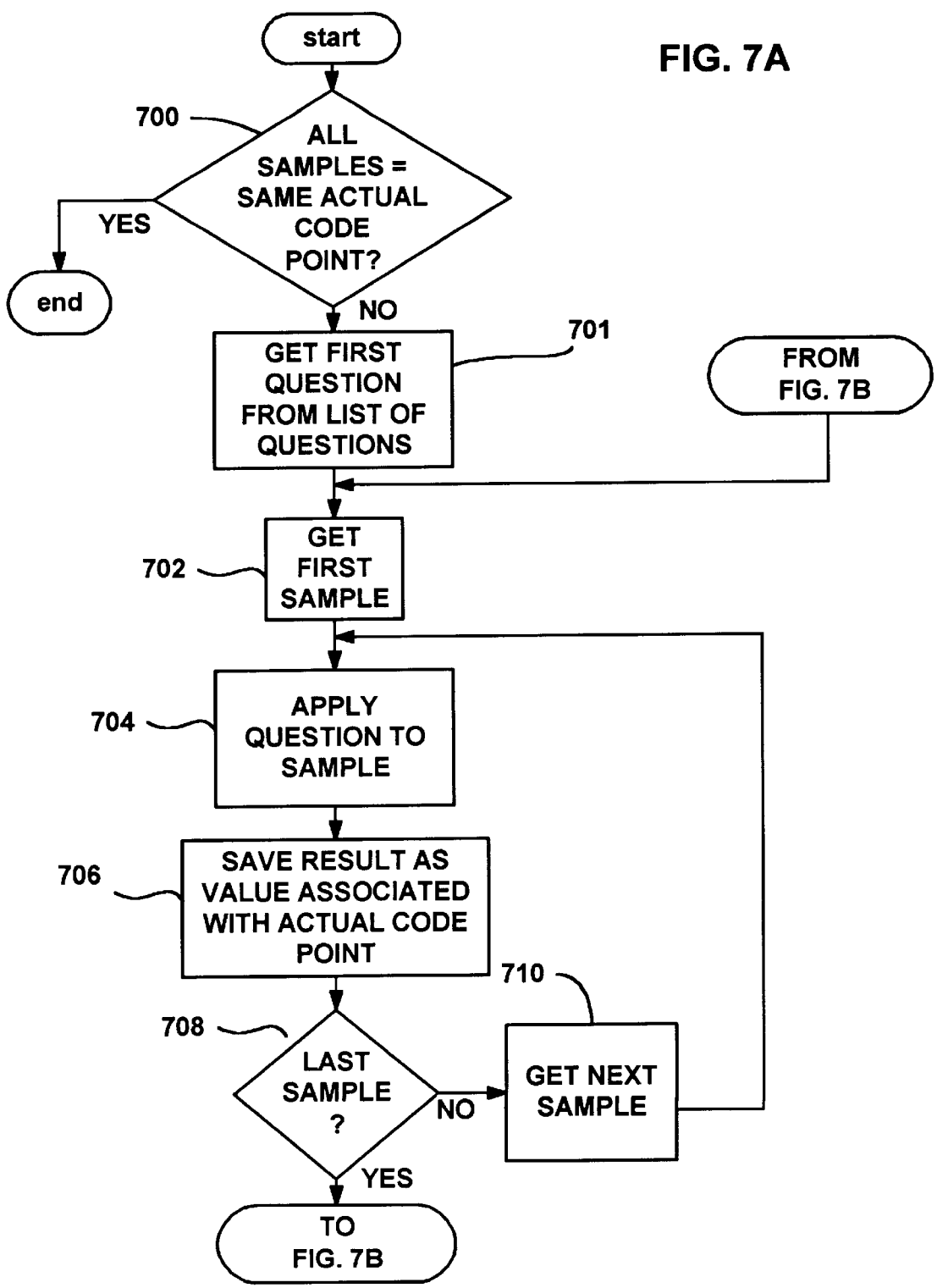
FIGS. 7A–7C comprise a flow diagram representing the general steps take to construct and train the secondary recognition system.
Figure 7B:
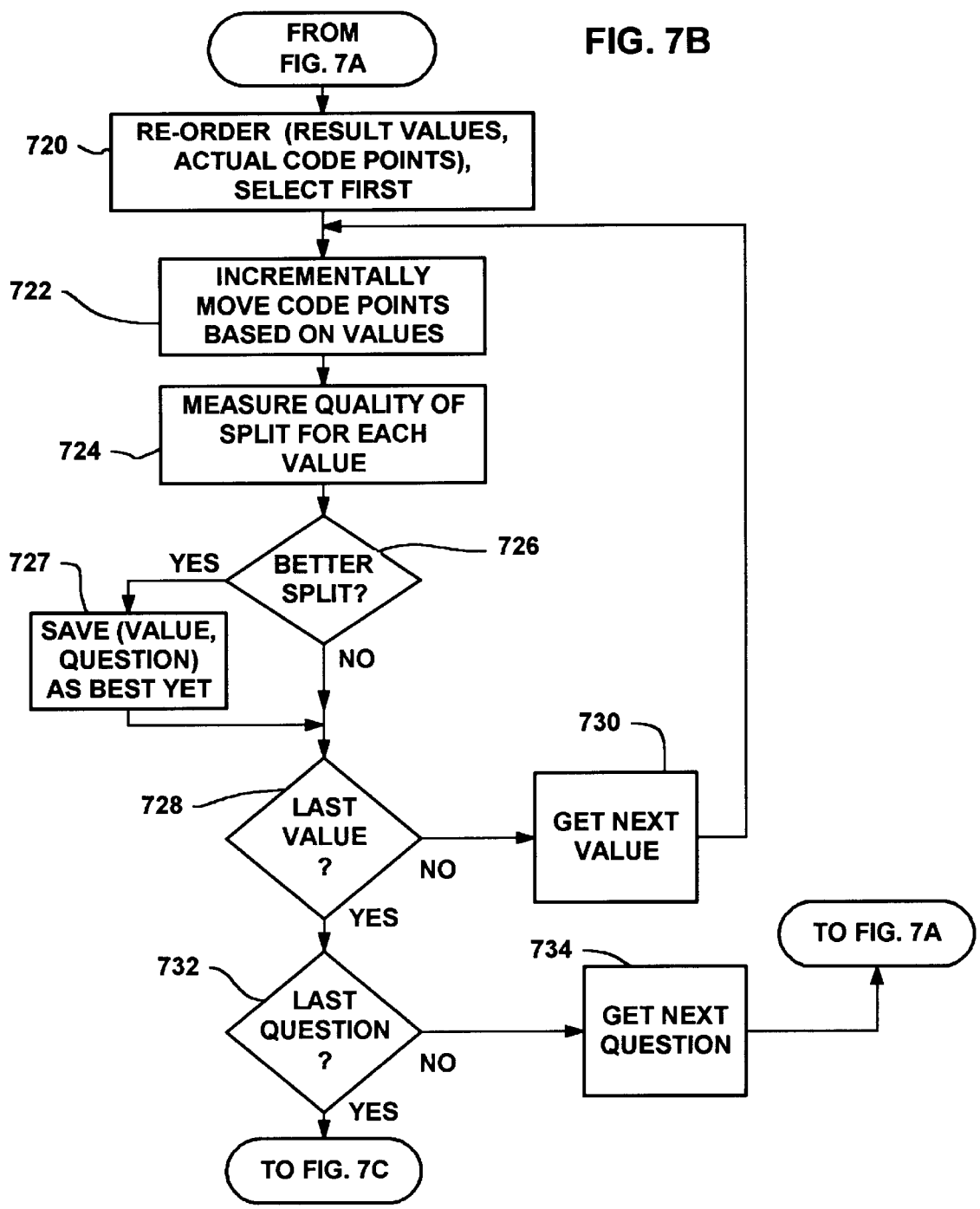
Figure 7C:
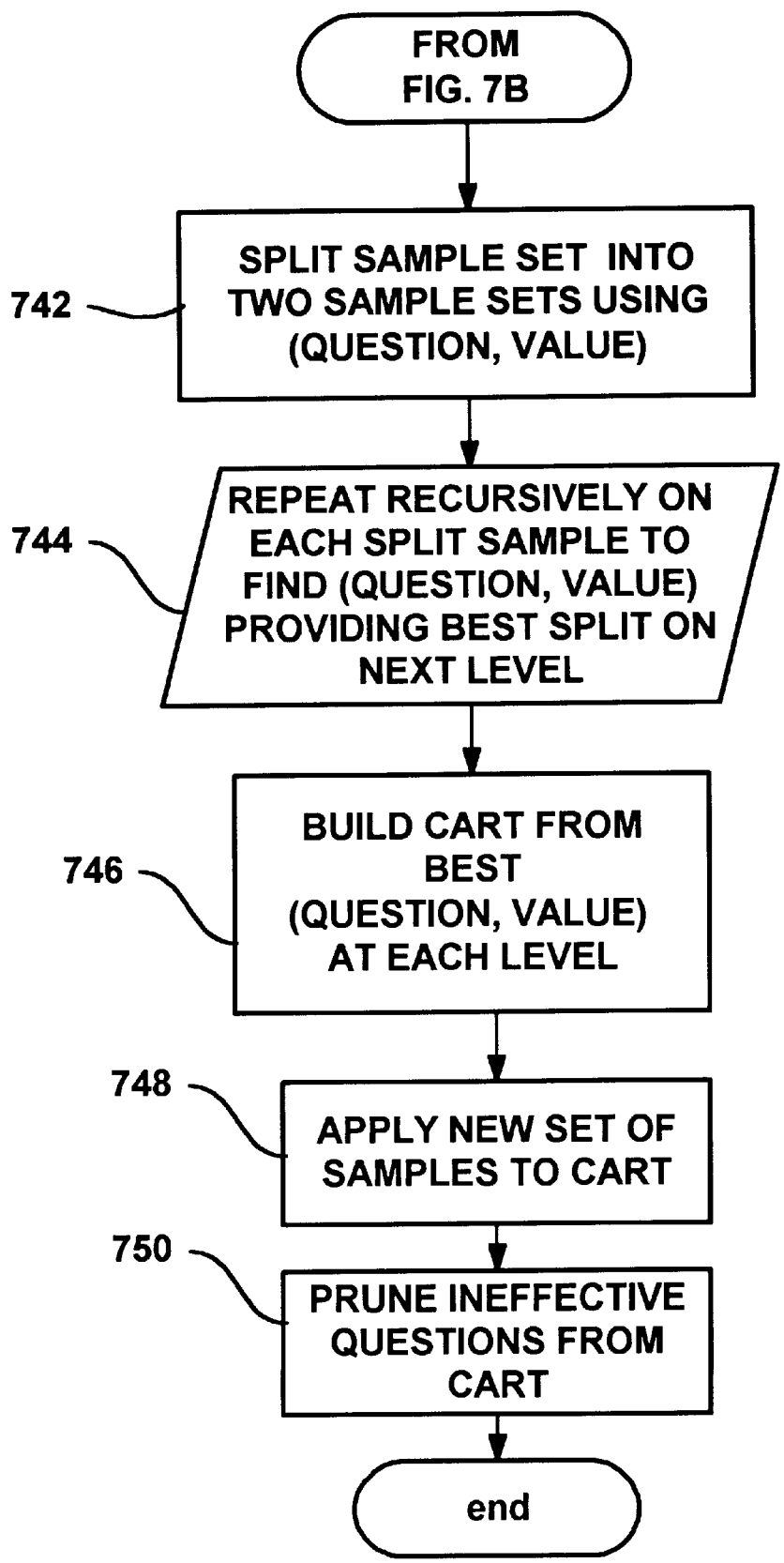
Figure 8:
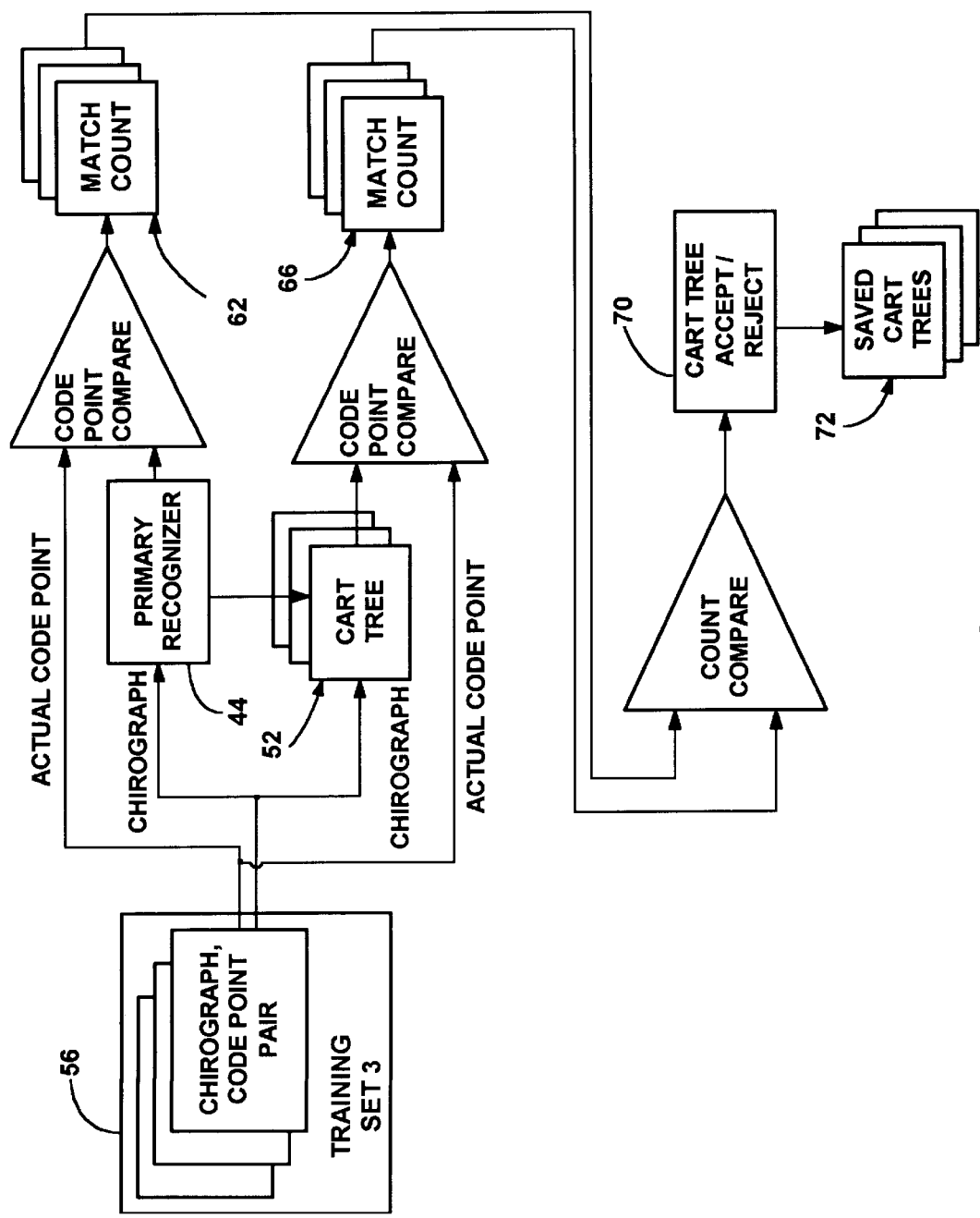
FIG. 8 is a block diagram representing functional components for optimizing the recognition mechanism of the present invention.

FIGS. 7A–7C generally describe how each CART tree is developed. First, a list of questions which are believed to be relevant in distinguishing confusion pairs is assembled. Such questions are frequently based on handwriting strokes, such as, "how many total strokes in the chirograph?", "what is the length of the first stroke?" and/or "what is the angle of the third stroke with respect to the first stroke?". At this time there is no standard set of questions, only questions based on the experience and observations of those skilled in the art. Note that the questions may be tailored to the stroke count in the chirograph which is known to the system. As will become apparent, the order of the questions is not important. Moreover, the primary recognizer may have provided some featurization information which the construction process can leverage in addition to its own featurization of the ink.

In general, the CART-building process 52 applies all of the questions to all of the samples (in each of the files $50_1$–$50_n$) in order to determine and rank which questions best resolve the primary recognizer's confusion for a given file. However, before building the CART, a preliminary test is performed by scanning the sample data at step 700 to determine if all of the actual code points in the given file are the same (and match the file). If so, the data in the sample is pure, hereby secondary recognition will not improve the overall recognition. Accordingly, the CART-building process 52 terminates for such a sample file.

In the more typical case wherein a lot of sample data is present in a file, however, at least some of the chirographs will have actual code points that do not directly match the code point (and thus the corresponding file) determined by the primary recognizer. Thus, to build a CART, at step 701 of FIG. 7A, the first question in the list is obtained, the first sample chirograph (from one of the files, e.g., $50_1$) is obtained at step 702, and at step 704 the question is applied to the sample, producing a result. For example, the question may inquire as to the horizontal length of the first stroke, and result in a value of nine (highest x-coordinate minus lowest x-coordinate equals 9) for the first sample.

The resulting value is saved in conjunction with the actual code point for that sample, e.g., (value, actual code point) at step 706, and at steps 708–710, the process repeated on the next sample in the selected file $50_1$. This time through, step 706 again saves whatever (value, actual code point) results from this next sample for this first question. Ultimately, via steps 708–710, all the samples in the file will be tested against the first question, whereby all of the resultant values and their associated code points are known in the given file for which the CART tree is being developed for this question.

At this time, the steps of FIG. 7B are executed, in general to find out which of the values divides (splits) the chirographs in the file along the lines of their associated actual code points. It should be noted that it is possible, although generally impractical, to test every conceivable value with each question in a brute-force approach to determine the best split. For example, every length from 1 to 1000 may be tested for the length question, and so on with other wide ranges of values for the other questions. Instead, however, only the actual results obtained by the steps of FIG. 7A are used for this purpose, substantially speeding up the split-testing process of FIG. 7B. Moreover, while each unique result can be applied as a binary question against each of the samples to determine the split, a more optimal way is to use the already existing result data to determine the best split.

More particularly, step 720 sorts the results obtained for the given question (in FIG. 7A) into an ordered range of (values, actual code points). Thus, for the length example, the shortest lengths may have been forty and the longest one-hundred. To test the quality of the split, at step 722, each of the code points having a "value equal forty" are moved into one (e.g., left) subset, and all code points having other values placed (or left to remain) in another (e.g., right subset). The movement of the code points occurs incrementally. Then, when all of the "forty" values have been moved, at step 724, the quality of the split is measured as described below. As can be appreciated, CART trees are binary, and thus the movement effectively asked the question of all samples in the file $50_1$, "is the horizontal length of the first stroke less than or equal to forty?", i.e., $X_{max}s1-X_{min}s1<=40$? Each chirograph is effectively sorted according to this question, with the code points for yes answers placed in one (left branch) set and the code points for no answers placed in another (right branch) set.

In keeping with the invention, at step 724, the quality of the split is evaluated according to some split criterion. A preferred way to determine the quality of the split is to test for homogeneity of the sets using the Gini diversity index. In general, the Gini diversity index uses a sum of the squares method for the homogeneity (h) using the quantities of the code points in each of the left and right sets, i.e., $$h_{Left}=[cp_{1Left}/(cp_{1Left}+cp_{2Left}+\ldots cp_{nleft})]^2+[cp_{2Left}/cp_{1Left}+cp_{2Left}+\ldots cp_{nleft})]^2+\ldots[cp_{nLeft}/(cp_{nLeft}+cp_{2Left}+\ldots cp_{nleft})]^2$$

and $$h_{Right}=[cp_{1Right}/(cp_{1Right}+cp_{2Right}+\ldots cp_{nRight})]^2+[cp_{2Right}/(cp_{1Right}+cp_{2Right}+\ldots cp_{nRight})]^2+\ldots[cp_{nRight}/(cp_{1Right}+cp_{2Right}+\ldots cp_{nRight})]^2,$$

where subscript left and right indicate the left and right sets and $cp_1, cp_2 \ldots cp_n$ represent the number of code points of each code point value in each set. The homogeneity results are then weighted by the number of code points in each set, such that the final homogeneity equation for this question (Q1) and value (V1) reads:

$$H(Q1, V1)=[(h_{Left})(cp_{1Left}+cp_{2Left})+(h_{Right})(cp_{1Right}+cp_{2Right})]/(cp_{1Left}+cp_{2Left}+cp_{1Right}+cp_{2Right}).$$

Step 726 tests the quality of the split against any previous results, if any, and if better, step 727 saves the homogeneity result H(Q1, V1) as the best quality split. Note that step 727 saves the best split over all the questions so far, including possibly the present question, whereby step 726 compares each subsequent split agains the result from the best (question, value) previously determined.

Steps 728–730 cause the split for the next value to be tested and compared again, this time using the next value in the range, e.g., forty-one (41). By incrementally moving the code points corresponding to this value to the left split subset at step 722, the sample is now effectively split with code points in the left subset being those having values less than or equal to forty-one. Note that the code-points associated with forty previously moved to the left subset remain there, since these are also less than forty-one. Then, at step 724, the next homogeneity $H(Q1, V2)$ is computed, compared at step 726 (against the value for forty, which was the best so far), and if an improvement, saved as the best value, along with the identity of its corresponding question, at step 727.

Once all the values have been tested in this manner, as determined by step 728, the best value (i.e., the value providing the most homogenous split) for this first question has been determined. Subsequently, the next question is selected (steps 732–734), and the process repeated on the samples in the file using this next question. The best (question, value) pair will continue to be saved for comparison against splits of other questions and values, and so on, until the overall best single (question, value) pair is known.

Ultimately, all of the values for all of the questions will have been used to split the sample and calculate the homogeneity therefor, with the best (question, value) pair having been saved. At this time, the steps of FIG. 7C are executed to establish a CART tree which appropriately asks the best questions in the best order according to which produces the best (most homogeneous) split of the code points. Significantly, the process thus automatically locates the best (available) question/value pair at various levels. As a result, the process often finds that the best available question is one that is not originally believed by humans to be that important, but was nevertheless submitted. Note that this is not necessarily the ideal question and value combination for homogeneously splitting the sample set, only the best question and value of those available.

In any event, once the best question and value is known, the sample set (file $50_1$) is then split at step 742 into two subsets using this best question/value pair. Then, as represented by step 744, the process is iteratively repeated on each of these two subsets to find the next best question and value pair for most homogeneously splitting each of the subsets. The process is repeated recursively, (i.e., the process returns to step 700 of FIG. 7A to optimally split each of the two subsets), branching into more and more homogeneous subsets until a point is reached at which the homogeneity is no longer improved. As can be appreciated, the recursive operation at lower and lower levels establishes the best question/value pairs at each branch and level to further refine the distinction the confusion pairs. At step 746, a CART tree is built from these question and value pairs at the various levels.

However, primarily because available sample data is limited, the CART trees tend to be imperfect, especially at the lower levels. Moreover, the CART trees may be large, requiring a lot of storage that is not generally available in hand-held computing devices. Accordingly, at step 748 a new set of samples is applied to the CART to test which of its embedded questions are making the correct decisions. Those questions which are determined to be ineffective at resolving the confusion pairs are removed (pruned) from the tree at step 750. This leaves a more manageable CART in terms of size while not adversely affecting the recognition accuracy.

After all the files $50_1$–$50_n$ have had a CART tree developed therefor in the manner described above, a CART tree exists for each code point supported by the system. However, some of these CART trees may have only one possible output that is the same code point as output by the primary recognizer. Such CART trees do not improve the recognition, and are thus discarded.

Similarly, (if the primary recognizer is one that returns a code point), there is no assurance that a particular CART tree will improve the recognition accuracy of the primary recognizer. This is particularly true when CART trees are developed with lesser amounts of data, as in general, the more training data, the better the CART tree at resolving confusion. If a particular CART tree does not improve the recognition some threshold amount (which may be even a very slight improvement), there is no reason to keep it, since a CART tree costs storage space. Similarly, even though CART trees are extremely fast, secondary recognition using a CART tree adds to the total recognition time, again adding cost.

Thus, FIGS. 8 and 9A–9C represent one process for optimizing the recognition mechanism by discarding unneeded CART trees. First, at step 900, a first chirograph from a third training set 56 (FIG. 8) is selected. At step 902 the chirograph is sent to the primary recognizer 44. At step 904, if the code point returned by the primary recognizer 44 is the same as the actual, correct code point, a primary recognizer match count 62 for the CART tree (i.e., this file) is incremented at step 906.

Then, at step 908, the appropriate CART tree, corresponding to the code point returned from the primary recognizer 44, is selected. At step 920, the same chirograph is now provided to the CART tree, whereby a decision is made by the CART tree and a code point returned therefor. At step 922, if the code point returned by the CART tree 52 is the same as the actual, correct code point, a CART match count 66 for this CART tree is incremented at step 924. Steps 926–928 repeat the process until all chirographs in the third training set 56 are tested.

Figure 9C:
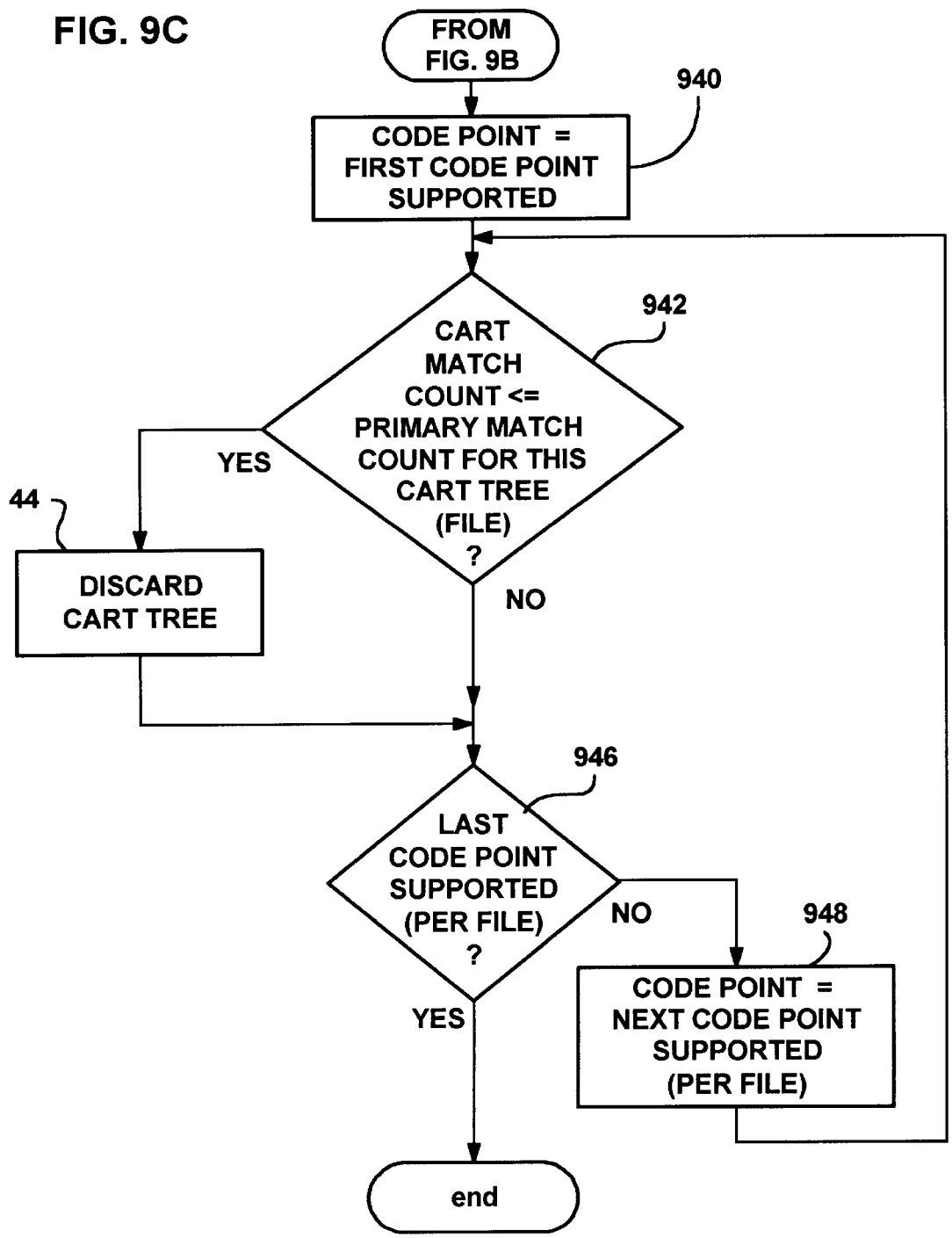

Lastly, FIG. 9C compares the primary and CART match counts for each CART tree to determine if the CART tree improved the recognition. More particularly, the first supported code point (there is one file per each) is chosen at step 940, and the CART match count 66 for this CART tree compared against the primary recognizer match count 62. If the CART match count is less than or equal to the primary match count, the CART tree is discarded at step 944 since it did not improve the recognition mechanism. Otherwise the CART tree for this code point is kept. Steps 946–948 repeat the comparison until all supported code points have been tested. Note that if desired, step 942 can be a more complex test so as to discard any CART tree that does not improve the recognition process by some threshold amount. For example, if the ratio of the CART match count to the primary match count does not exceed 1 plus some fractional amount, then the CART tree can be discarded. However, it should be noted that with the above optimizations, the CART trees (which may number several hundred) only add about 18 kilobytes to a one megabyte primary recognizer, so any memory savings resulting from discarding a CART tree that only rarely improves recognition is probably not worth a reduction in recognition accuracy.

Indeed, the combined primary and secondary recognition mechanism of the present invention has been thoroughly tested, and for certain confusion pairs has a 99.7 percent accuracy rate. The 0.3 percent error rate is believed to result from characters too poorly written even for humans to discern, and in fact is comparable to the recognition error rate of humans. Note that the present invention is highly flexible and extensible. For example, if the primary recognizer changes, thereby changing the confusion pairs, new CART trees can be automatically generated and tested in the above-described manner. Similarly, as additional questions are conceived, those questions can be simply tried against the others to determine if they improve the homogeneity of a given split and thus the accuracy of the mechanism.

Note that with a primary recognizer that returns a shape index that is something other than a code point, at least some minimal CART tree that maps the shape index to a code point is needed. However, although this increases the amount of CART storage, using shape codes to train the primary recognizer and partition data for generating CART trees, and then using actual code points to train the CART trees, results in a limited, but smaller and faster primary recognizer. Advantages are again obtained because the primary recognizer is optimized to break chirograph data into classes of shapes, while the CART trees are optimized to focus in on fine differences in the chirographs.

Figure 10:
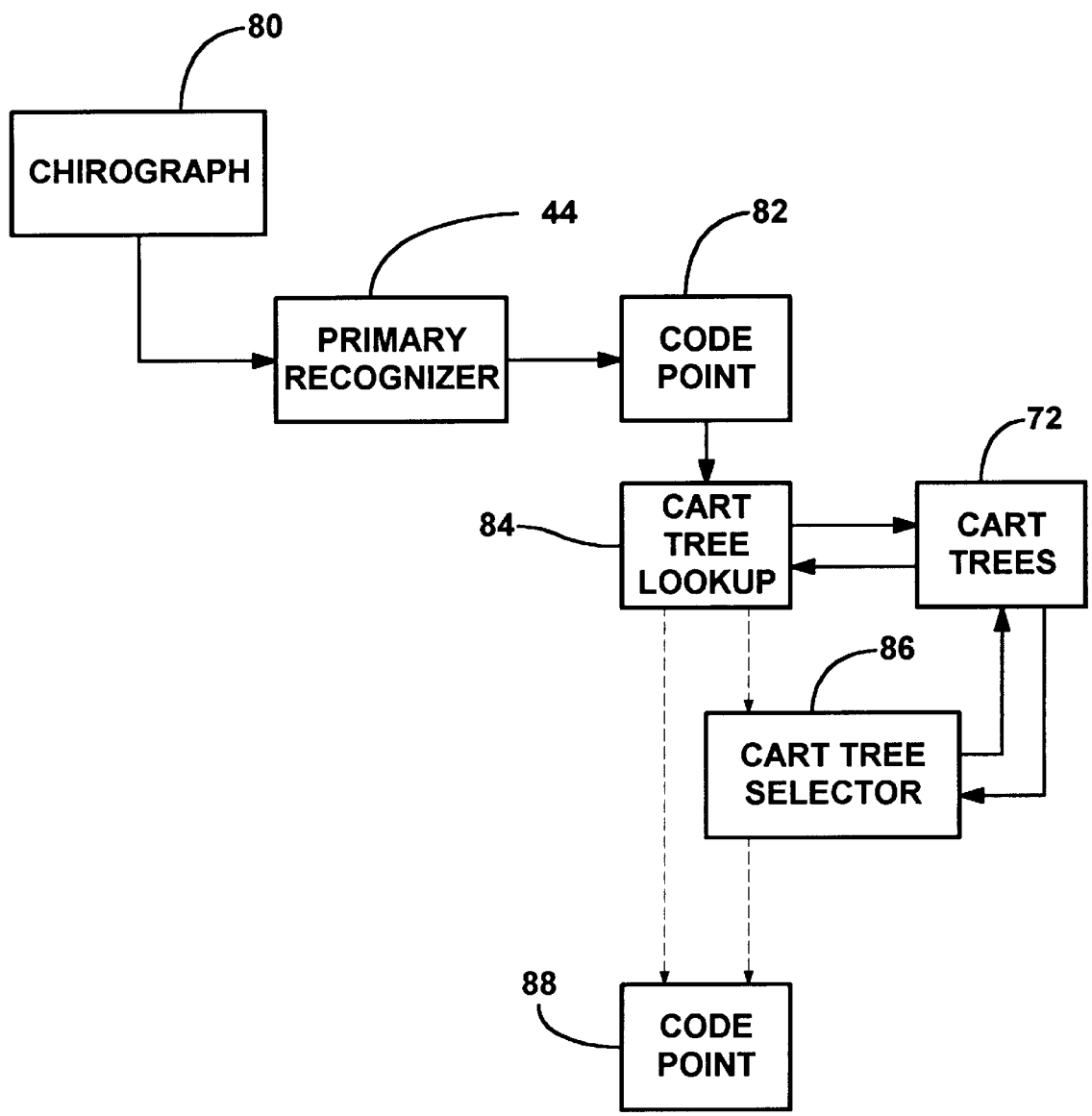
FIG. 10 is a block diagram representing functional components for using the recognition mechanism of the present invention to recognize a chirograph.
Figure 11:
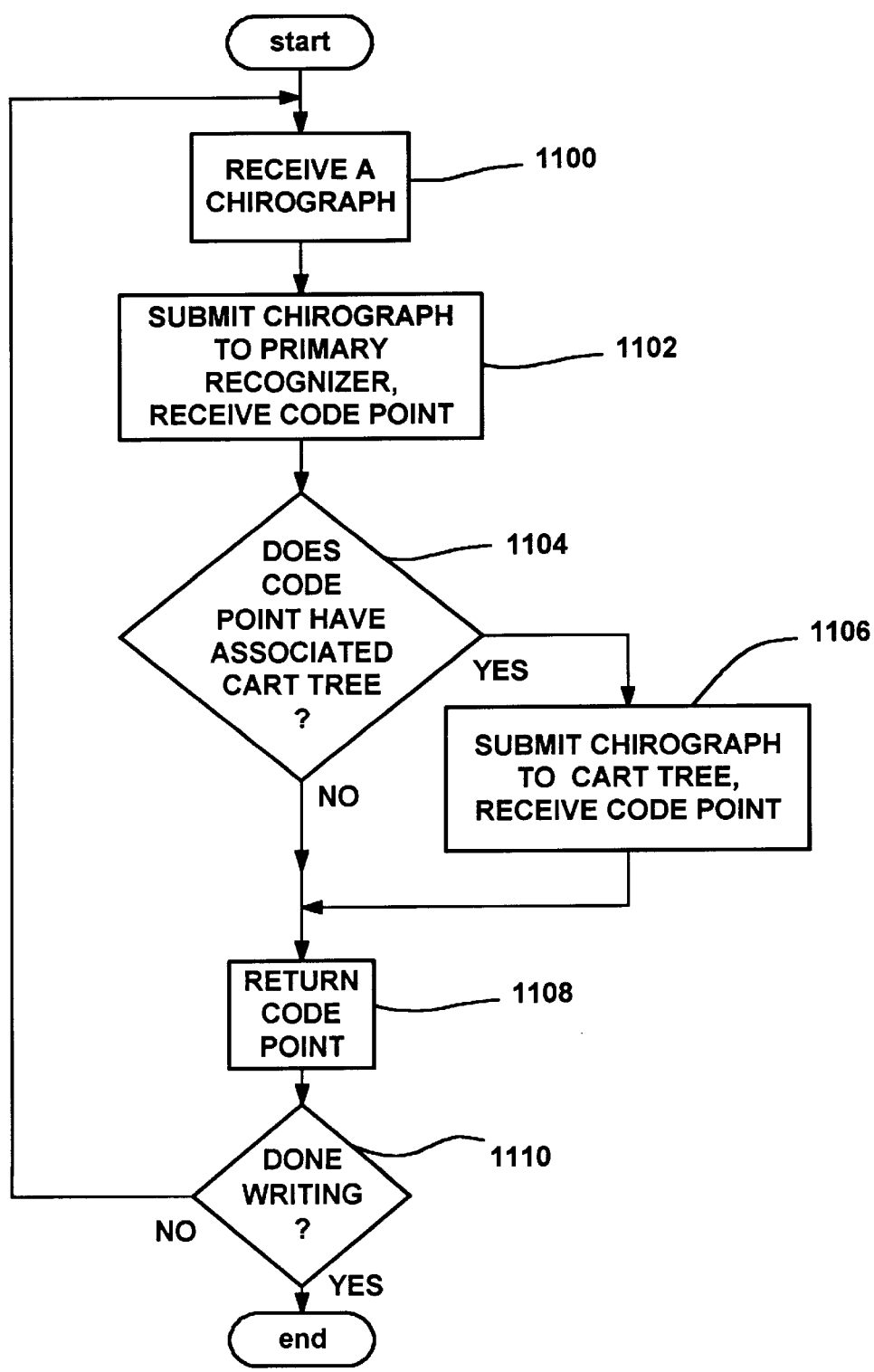
FIG. 11 is a flow diagram representing the general steps taken when using the recognition mechanism of the present invention to recognize a chirograph.

Once the recognition mechanism including the CART trees is developed, the recognition mechanism may be used in a relatively low powered system, e.g., a hand-held personal computing device. FIGS. 10–11 shown how the system is used to recognize a character. First, the system receives a chirograph 80 (FIG. 10) from a user at step 1100 in a known manner, such as via pen input on a touch-sensitive screen. Then, the recognition mechanism of the present invention submits the chirograph to the primary recognizer 44 and receives a code point (or shape index) 82 therefrom (step 1102). At step 1104, the code point 82 is used (by a lookup process 84 or the like) to determine if the code point has a CART tree associated therewith. If not, the primary recognizer's returned code point 82 is returned by the recognition mechanism at step 1108 as the returned code point 88.

However, if a CART tree is associated with the code point 82, the appropriate CART tree in the set of available CART trees 72 is selected and the chirograph 80 submitted thereto at step 1106. Note that a shape index code that is not by itself a code point has a secondary recognizer (CART tree) associated therewith, even if only a minimal one that converts the shape index to a code point. The code point returned by the selected CART tree is returned at step 1108 as the returned code point 88. The recognition mechanism repeats until the user is done writing, as detected by step 1110.

Although not necessary to the invention, if the primary recognizer returns a list of alternative code points, the list can be scanned for code points having associated CART trees, and the secondary recognizer operated for one or more of the code points in the list. The secondary process reorders the list with the result from the CART tree placed on top, i.e., with the highest probability. Moreover, CART trees can provide alternatives ranked by probabilities, all of which can be weaved into a composite, probability-ranked list.

Moreover, a plurality of CART trees can be associated with a single character. For example, a first CART tree can be provided as a secondary process for differentiating two-stroke "A"-shaped characters, and a second, distinct CART tree for differentiating three-or-more-stroke "A"-shaped characters. Moreover, the primary recognizer can be arranged to split strokes, e.g., a one-stroke "A" shaped character can first be split into two strokes by the primary recognizer prior to its analysis thereof. Features other than stroke count may similarly be used by the primary and/or secondary recognizers.

Lastly, it can be appreciated that the invention is applicable to both on-line and off-line character recognition. In on-line character recognition, the points in the character are received as coordinates of the form (x, y, time), i.e, the points in sequence along with pen-up and pen-down positions are known. Off-line chirographs are only x-y points in no particular order. The invention is valuable in either type of recognition, although the primary and secondary recognizer (e.g., questions therefor) will be rather different.

As can be seen from the foregoing detailed description, there is provided an improved method and mechanism for reducing the error rate in handwriting recognition. The method and mechanism differentiates ordinarily-confused characters with a high rate of success, and can be automatically trained using sample data. The method and mechanism that is fast, reliable, cost-efficient, flexible and extensible.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method of recognizing chirographs input into a computer system, comprising the steps of:

providing a primary recognizer for converting chirographs to code points;

training a plurality of secondary recognizers to differentiate chirographs which produce selected code points when provided to the primary recognizer by providing a first training set comprising a plurality of chirographs and actual code points, receiving chirographs from the first training set, providing each received chirograph to the primary recognizer and receiving a recognized code point therefrom, and grouping each chirograph and its actual code point into one of a plurality of sets, the set determined by the recognized code point returned by the primary recognizer, and associating a secondary recognizer with each selected code point;

receiving a chirograph;

providing the chirograph to the primary recognizer and receiving a code point corresponding thereto;

determining if the code point corresponds to a selected code point having a secondary recognizer associated therewith, and if so, passing the chirograph to the secondary recognizer and returning a code point from the secondary recognizer;

determining which secondary recognizers improve the recognition accuracy of the primary recognizer by individually providing chirographs from another training set to the primary recognizer and to the secondary recognizer and for each chirograph, receiving a recognized code point from each recognizer, comparing the code point recognized by the primary recognizer to the actual code point of the chirograph, and if the code points are equal, incrementing a primary match counter associated with the actual code point, comparing the code point recognized by the secondary recognizer to the actual code point of the chirograph, and if the code points are equal, incrementing a secondary match counter associated with the actual code point, comparing the primary match counter for each code point against the secondary match counter, and if the secondary match counter is less than or equal to the primary match counter, discarding the secondary recognizer for that code point; and selecting as the selected code points those code points which correspond to the secondary recognizers that improve the recognition accuracy.

\* \* \* \* \*